US008757939B1

(12) United States Patent
Block

(10) Patent No.: US 8,757,939 B1
(45) Date of Patent: Jun. 24, 2014

(54) DRILL BIT JIG

(76) Inventor: Michael Block, Phoenix, AZ (US)

(*) Notice: Subject to any disclaimer, the term of this patent is extended or adjusted under 35 U.S.C. 154(b) by 1212 days.

(21) Appl. No.: 12/650,987

(22) Filed: Dec. 31, 2009

Related U.S. Application Data

(63) Continuation-in-part of application No. 11/852,109, filed on Sep. 7, 2007, now Pat. No. 8,152,420.

(60) Provisional application No. 60/843,245, filed on Sep. 7, 2006.

(51) Int. Cl.
B23B 47/26 (2006.01)

(52) U.S. Cl.
USPC ............. 408/115 R; 408/115 B; 408/103

(58) Field of Classification Search
USPC ..... 408/115 R, 103, 97, 115 B, 72 B; 269/16, 269/22, 81, 87.1, 87.2, 87.3, 91, 108, 118, 269/119, 147, 165, 219, 90, 5
See application file for complete search history.

(56) References Cited

U.S. PATENT DOCUMENTS

| 492,498 | A | * | 2/1893 | Liddell | 493/232 |
| 2,211,634 | A | * | 8/1940 | Baker | 408/115 R |
| 2,626,513 | A | * | 1/1953 | Lombardi | 66/217 |
| 3,327,573 | A | * | 6/1967 | Prussiano | 408/115 R |
| 3,465,620 | A | * | 9/1969 | Hilburn | 408/115 R |
| 3,626,513 | A | * | 12/1971 | Pytlak | 408/115 R |
| 3,700,344 | A | * | 10/1972 | Grumbach | 408/108 |
| 4,153,384 | A | * | 5/1979 | Isaken | 408/115 R |
| 4,752,162 | A | * | 6/1988 | Groh | 408/115 R |
| 5,018,912 | A | * | 5/1991 | Reitz | 408/115 R |
| 5,118,228 | A | * | 6/1992 | Story | 408/107 |
| 5,730,560 | A | * | 3/1998 | Marcelloni | 408/72 B |
| 5,791,834 | A | * | 8/1998 | Zehrung | 408/1 R |
| 5,954,461 | A | * | 9/1999 | Lemieux | 408/115 R |
| 6,283,685 | B1 | * | 9/2001 | Lemieux | 408/115 R |
| 6,309,146 | B1 | * | 10/2001 | Lasseter | 408/1 R |

FOREIGN PATENT DOCUMENTS

GB 2288356 A * 10/1995

* cited by examiner

Primary Examiner — Eric A Gates
Assistant Examiner — Paul M Janeski
(74) Attorney, Agent, or Firm — Schmeiser, Olsen & Watts LLP

(57) ABSTRACT

A drill bit jig includes an elongate member, two jig securing elements and a rotatable drill bit guide. The elongate member is hollow so that one or more elongate drill bits may be stored therein. The drill bit guide includes a plurality of through holes where the axes of the through holes are parallel to the axis of the elongate member. Each of the plurality of through holes in the drill bit guide has a different diameter for accommodating drill bits of different thicknesses. The jig securing elements each include an L-shaped bolt and a door protecting material encasing one of the straight sections of the bolt.

13 Claims, 11 Drawing Sheets

DRILL BIT JIG

CROSS REFERENCE TO RELATED APPLICATIONS

This application is a continuation-in-part of the earlier U.S. Utility patent application entitled "DRILL BIT JIG," Ser. No. 11/852,109, filed Sep. 7, 2007, now pending, which claims priority to U.S. Provisional Patent Application entitled "Drill Bit Jig", Ser. No. 60/843,245 filed Sep. 7, 2006, the disclosures of which are hereby incorporated entirely herein by reference.

BACKGROUND OF THE INVENTION

1. Technical Field

This invention generally relates to jigs and more particularly to jigs for positioning and guiding drill bits and methods for using such jigs to drill elongate holes without marring a surface of a work piece.

2. State of the Art

In the past, technicians installing security systems on doors have used line of sight to align a bit during hand drilling of a hole in a generally widthwise direction from a hinge area to a bolt area of a security door. Often this method of "eye-balling" has resulted in ruining or damaging the door by drilling through a front or rear surface of the door.

SUMMARY OF THE INVENTION

The present invention relates generally to jigs and more particularly to jigs for positioning and guiding drill bits during a drilling operation.

In a simple form, the present invention may include a jig having an elongate member with a longitudinal axis. The jig may also include at least one adjustable jig securing element adjustably supported on the elongate member. The jig may also include at least one rotatable drill bit guide piece protruding transversely relative to the elongate member and rotatable to account for deflection of a drill bit travelling through a door. The jig may also have structure in the bit guide piece that forms a through opening in the bit guide piece. The through opening may extend lengthwise in a direction generally parallel to the longitudinal axis of the elongate member.

The jig securing element may include an L-shaped bolt passing through the elongate member. An elbow portion and a shorter straight section of the L-configured bolt may extend transversely on a first clamping side of the elongate member while a longer straight section of the L-configured bolt may extend transversely on a second tightening side of the elongate member. At least a portion of the longer straight section may be threaded. A threaded knob or nut may be received on threads of the straight threaded portion. The threaded knob or nut may be turned in a first direction to draw the bolt through the sliding piece in a first tightening direction transverse to the longitudinal axis of the elongate member and to extend the bolt through the sliding piece in an opposite second loosening direction that is also transverse to the longitudinal axis.

The jig may include two jig securing elements substantially similar to the jig securing element described above. Thus, the elbow portion of respective jig securing elements may be engaged on opposite edges of a work piece to be drilled.

The bit guide may be incorporated into one or more blocks or plates. The block may extend transverse to the elongate member on the first clamping side of the jig. Thus, when the jig is secured to the work piece, the bit guide may be aligned so that the through hole lies in a plane of the work piece. By aligning the elongate member along a line to be drilled through the work piece, the bit guide may be placed to guide a bit through the work piece along a predetermined line during drilling. Thus, errors in drilling may be avoided.

It is to be understood that several holes of a variety of sizes and/or positions may be provided in the block that incorporates the bit guide. Thus, a user may select any of a variety of bit sizes and may drill at any of a variety of locations to accommodate different applications and different thicknesses of work pieces.

In another simple form, a method of drilling through a width of a work piece in accordance with the present invention may include aligning a jig with a desired line of drilling. The method may include securing the jig to the work piece. The method may include inserting a drill bit through a desired bit guide secured to or forming part of the jig. The method may include drilling widthwise through the work piece along the line of drilling.

The method enables drilling through the width of the work piece without accidentally penetrating a surface in a thickness direction of the work piece. The work piece may be a door having a height and a thickness in addition to a width. The line of drilling may be any transverse direction relative to a height dimension of the door. Alternatively, the jig may be used to drill in a height direction of the door. The present invention enables drilling through a width, a height, or any diagonal direction between a width and a height without penetrating through a front or a rear surface of the door. Overall, the jig of the present invention may be used to drill in any direction or any plane of the door.

The method may include aligning an elongate member in an aligned position relative to a line to be drilled on the work piece. The step of securing may include clamping the elongate member in the aligned position. The step of aligning may include aligning a through hole in the bit guide with a desired location on a thickness of the work piece to be drilled. The step of securing may include aligning a longitudinal axis of the through hole in the bit guide with a longitudinal axis of the elongate member in a generally parallel relationship. The step of aligning may include selecting a through opening from among a plurality of through holes in the bit guide and inserting a drill bit through the selected through opening. Alternatively or additionally, the step of aligning may include placing one or more spacers between the elongate member and a clamping knob of the jig securing element to accommodate work pieces of varying thicknesses.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to jigs in general and more specifically to jigs for positioning and guiding drill bits and methods for using such jigs to drill elongate holes without marring a surface of a work piece.

Figure 1A:
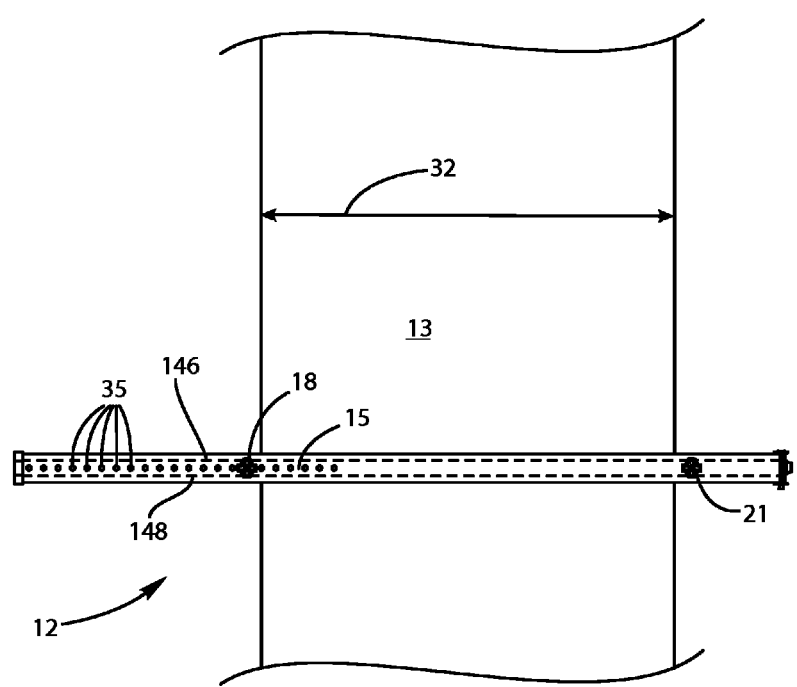
FIG. 1A is a front elevation view of a jig, in accordance with the present invention.
Figure 1B:
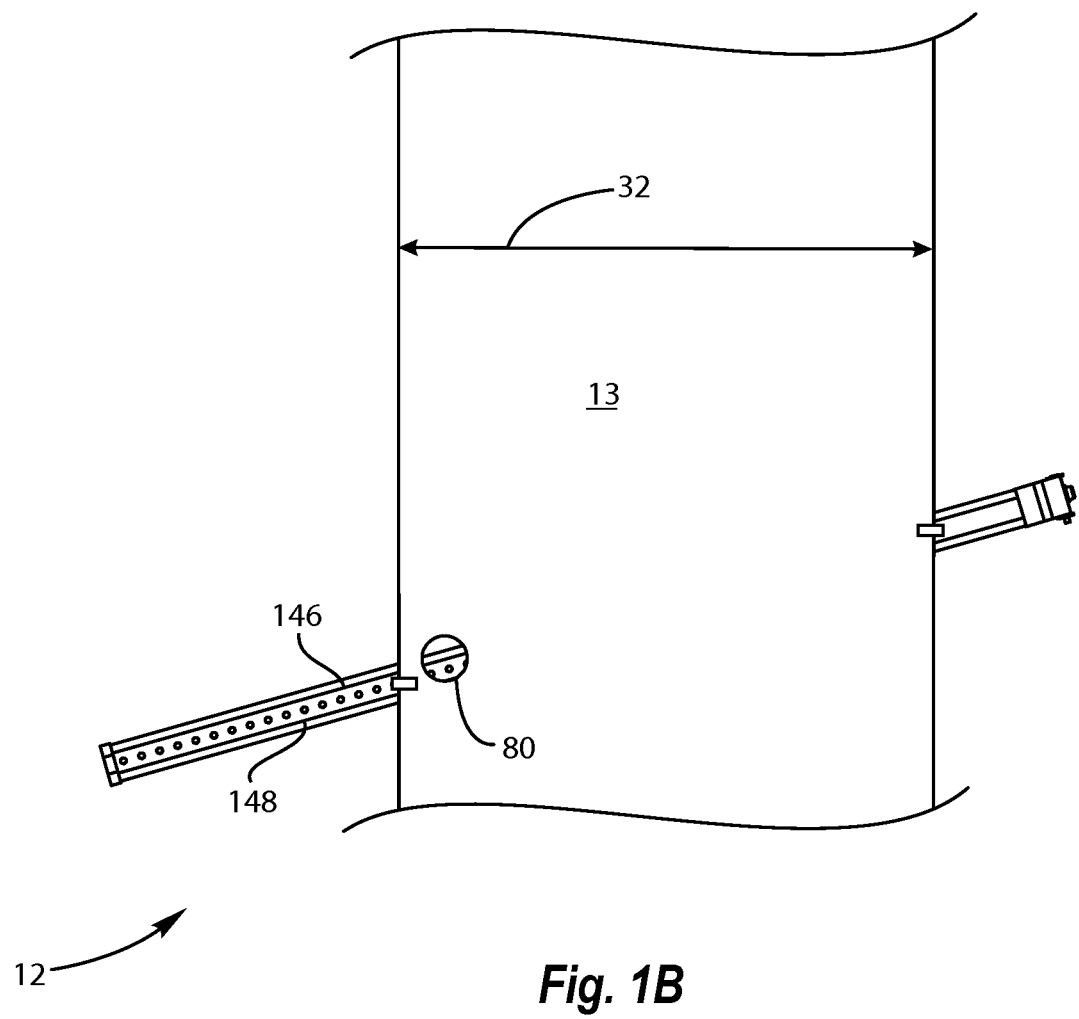
FIG. 1B is a rear elevation view of a jig, in accordance with the present invention.
Figure 2:
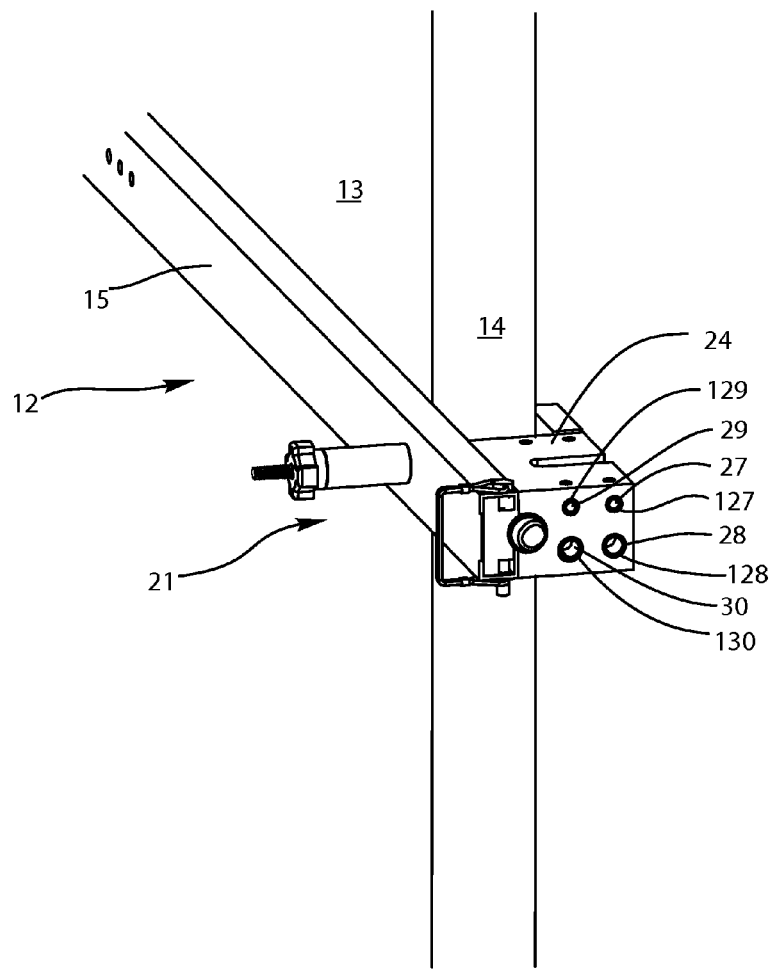
FIG. 2 is a perspective view of a first end of the jig and a drill bit guide, in accordance with the present invention.
Figure 3:
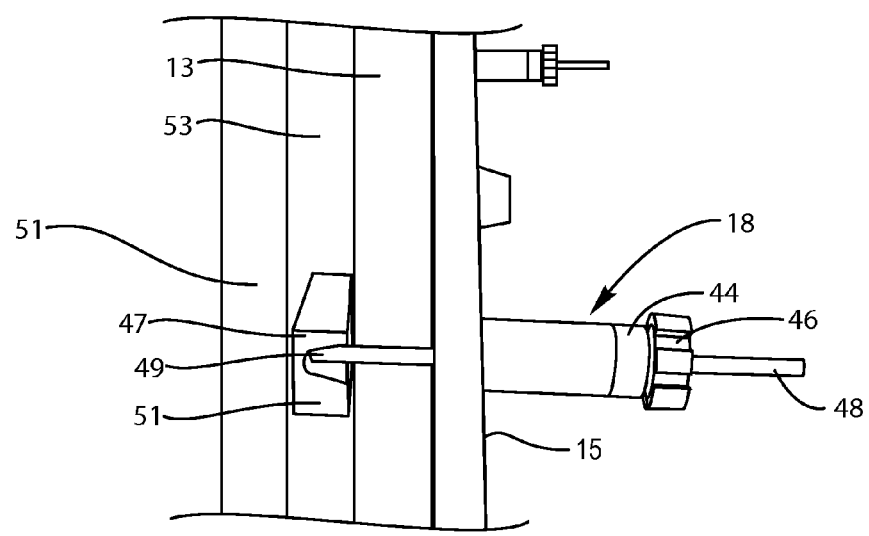
FIG. 3 is a perspective view of a second end of the jig, in accordance with the present invention.

FIGS. 1-3 show a jig 12 secured to a door 13. The jig 12 includes an elongate member 15, two jig securing elements 18 and 21, and a bit guide 24. In practice, the knob 80 and a hinge (not shown) would be removed and the elongate member 15 would be aligned with the opening in the door 13 that receives the knob 80. Then a hole would be drilled in a generally widthwise direction from the knob area to the hinge mounting area. Then wiring for carrying security signals could be placed in the hole.

At least one of the jig securing elements 18, 21 is adjustable along a length of the elongate member 15. In a particular embodiment, shown in FIG. 1, jig securing element 18 is adjustable along the length of the elongate member 15 by providing a plurality of through holes 35 in the elongate member 15. In this embodiment, the jig securing element 18 may be positioned in any one of the plurality of through holes 35 to accommodate doors of different widths. Alternatively, the jig securing element 18 may be adjustable by, for example and without limitation, replacing the through holes 35 with an elongate channel such that the jig securing element 18 may slide along the channel, or providing a jig securing element that surrounds the elongate member 15 and is thus slidable along the outside of the elongate member 15. In a still further example, either one or both of the jig securing elements 18 and 21 may be adjustable using any of the configurations discussed above at one or both ends of the elongate member 15.

FIG. 2 depicts the jig securing element 21 that is proximate to the bit guide 24. The bit guide 24 is shown extending transversely from the elongate member 15 and positioned in alignment with the thickness aspect 14 of the door 13. The drill bit guide 24 may be rigidly attached to the elongate member 15 using any effective attachment means. For example and without limitation, the drill bit guide 24 may be attached to the elongate member 15 by screws, bolts, welding, adhesive, etc. The through openings 27, 28, 29 and 30 that form part of the bit guide 24 have longitudinal axes that are aligned parallel to a longitudinal axis of the elongate member 15. Thus, when a bit is guided through one of the openings 27, 28, 29 and 30 in the bit guide 24 and drilled through the door 13, the bit can remain aligned in a plane generally parallel to the door 13 and avoid damage or ruin to the door 13 by the bit coming out through the front or rear face of the door 13 in a thickness direction.

Figure 6:
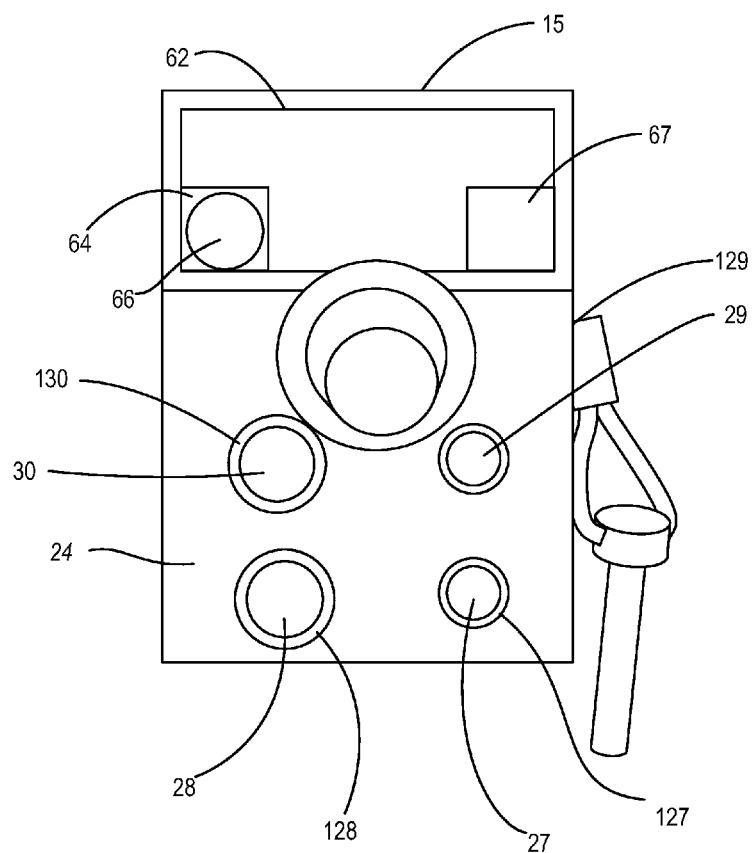
FIG. 6 is a side elevational view the first end of the jig, in accordance with the present invention.

As shown in FIGS. 2 and 6, the through openings 27, 28, 29 and 30 may have bushings or liners 127, 128, 129 and 130 to protect the through holes 27, 28, 29 and 30 against premature wear. Also, the bushings 127, 128, 129 and 130 may advantageously provide reduced friction between the bits and the jig 12 during drilling.

In the particular embodiment shown in FIG. 2, there are two sets of through openings in the bit guide 24 and each set includes two through openings with different diameters to accommodate two different sizes of drill bits. Through openings 27 and 28 are a first set of openings and through openings 29 and 30 are a second set of through openings, where through openings 27 and 29 have smaller diameters than through openings 28 and 30. Through openings 27 and 29 have substantially equal diameters and through openings 28 and 30 have substantially equal diameters. Thus, depending on the thickness of the door, a user can choose where to position the hole to be drilled by choosing one of the sets of through openings. Thus, the drill bit guide 24 can accommodate drill bits of a variety of sizes. Specifically, the drill bit guide 24 can accommodate drill bits with outer diameters that are slightly smaller than the inner diameters of the through openings 27, 28, 29 and 30. It should be noted that the drill bit guide 24 may have more or less than two sets of through openings and that each set may include more or less than two through openings. For example, the drill bit guide 24 may include three sets of through openings with three through openings in each set.

Figure 4:
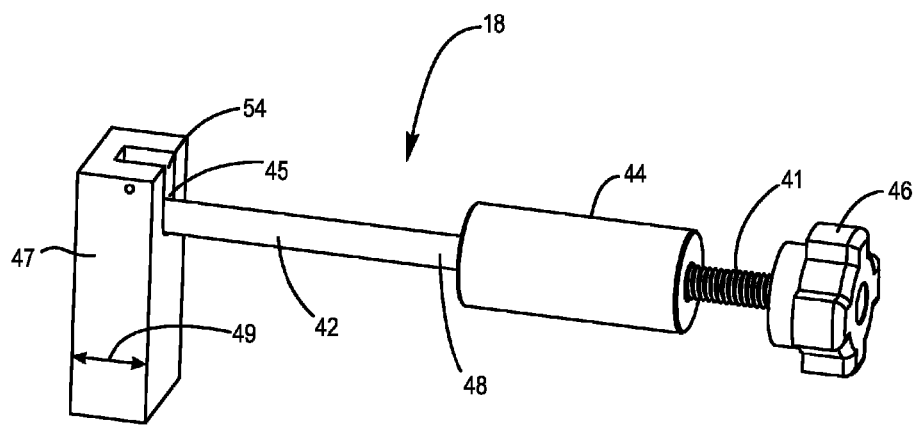
FIG. 4 is a perspective view of a jig securing element, in accordance with the present invention.

FIG. 4 is a detailed view of the jig securing element 18. It should be understood that the jig securing element 21 is substantially identical to jig securing element 18. The jig securing element 18 includes an L-shaped bolt 42 with an elbow portion 45, a longer straight section 48 and a shorter straight section encased by a door protecting material 47. At least part of the longer straight section 48 may have threads 41 that receive a clamping knob 46. The jig securing element 18 further includes a spacer 44 to accommodate different work piece thicknesses and to ensure that the threaded portion 41 of the bolt 42 does not pass through the holes 35 and 36 (shown in FIG. 7) in the elongate member 15 during clamping.

Figure 5:
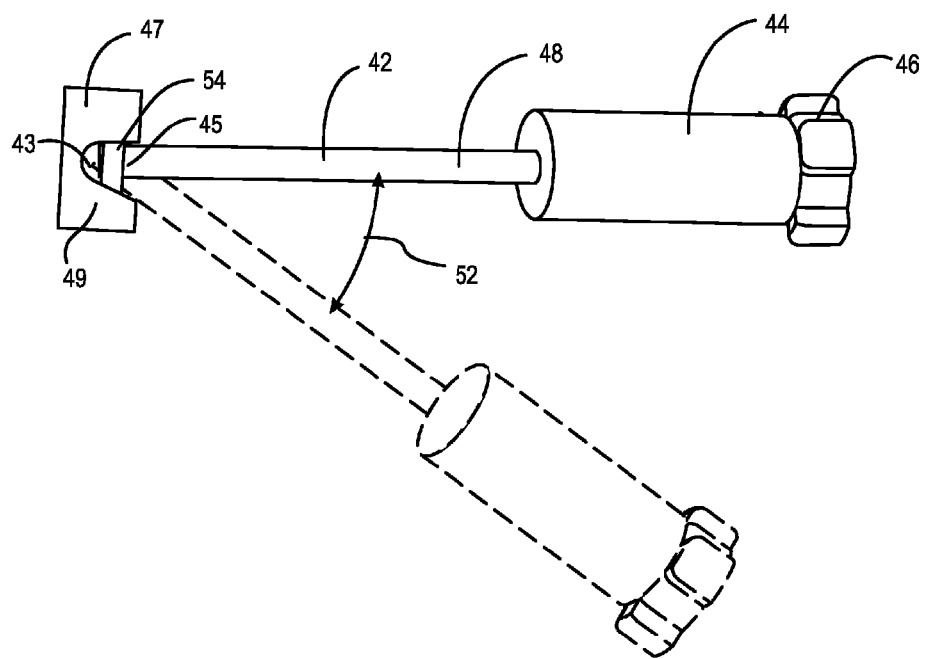
FIG. 5 is a top plan view of the jig securing element, in accordance with the present invention.

The material 47 may be generally rectangular and may be made of, for example and without limitation, plastic, UHMW plastic, polyethylene, wood, vinyl, polymer or any other material that will not cause damage to the surface of the door 13 during clamping engagement of the jig 12 on the door 13. In an alternative embodiment, the jig securing elements 18 and 21 may be provided without the door protecting material so that the shorter straight section of the L-shaped bolt 42 is in direct contact with the surface of the door when the jig 12 is in the clamped position. In the embodiment shown in FIGS. 4 and 5, the L-shaped bolt 42 is slightly pivotable within the protecting material 47 because an opening 43 in which the shorter straight section is disposed is larger than the diameter of the bolt 42. A bar 54 retains the bolt 42 within the protecting material 47. FIG. 5 is a top plan view showing the angle 52 through which the bolt 42 may pivot. As shown in FIG. 3, the thickness 49 of the protecting material 47 is such that the generally rectangular piece of protecting material 47 may fit in the opening 53 between the door 13 and the door jamb 51.

Referring again to FIGS. 1-3, the jig 12 is secured to the door 13 by positioning the jig securing elements 18 and 21 in through holes in the elongate member 15. Specifically, the long portion 48 of the L-shaped bolt 42 of jig securing element 18 passes through one of the plurality of through holes 35 disposed in one end the elongate member 15 and the long portion 48 of the L-shaped bolt 42 of jig securing element 21 passes through a through hole 36 (see FIG. 7) in the other end of the elongate member 15. The one of the plurality of through holes 35 through which the jig securing element 18 passes is chosen based on the width of the door 13 to be drilled. Thus, the jig 12 may be adjusted to be fittingly secured to doors having any of a variety of widths generally corresponding to a dimension 32. The elongate member 15 is in contact with a first surface of the door 13. The protecting material 47 and the shorter straight sections of the L-shaped bolts 42 encased therein are in contact with a second surface of the door 13. The position of the jig 12 is maintained by tightening the clamping knobs 46 on the threaded sections 48 of the bolts 42 of the jig securing elements 18 and 21 such that the door 13 and the elongate member 15 are clamped between the protecting material 47 and the spacers 44. Due to the length of the threaded section 41 and the spacer 44, the jig 12 may be adjusted to be fittingly secured to doors having any of a variety of thicknesses generally corresponding to a dimension 14.

As may be appreciated, the elongate member 15 may be formed of a generally hollow rectangular member that includes a plurality of through holes 35 and 36 (shown in FIG. 7) extending through the elongate member 15 in a direction that is transverse to the longitudinal axis of the elongate member 15. In a particular embodiment, the hollow rectangular member may be configured to support one or more bits within the jig 12. In another particular embodiment, shown in FIG. 6, the hollow member is filled with a protective filling material 62 that includes holes 64 therein for containing the bits 66. In the embodiment shown in FIG. 6, there are two holes 64, but it should be understood that the material 62 may contain more or less holes of varying sizes, depending on the number and size of the bits. Thus, a user may have an option for bit sizes and may enjoy the convenience of having the bits 66 kept together with the jig 12. Furthermore, the bits 66 are protected from any marring and users are protected from injury by the bits 66. The bits 66 used in widthwise drilling applications must be free from damage on the bit tips in order to be capable of drilling an entire width without deviating and coming out through a front or rear surface of the door in a thickness direction.

Figure 7:
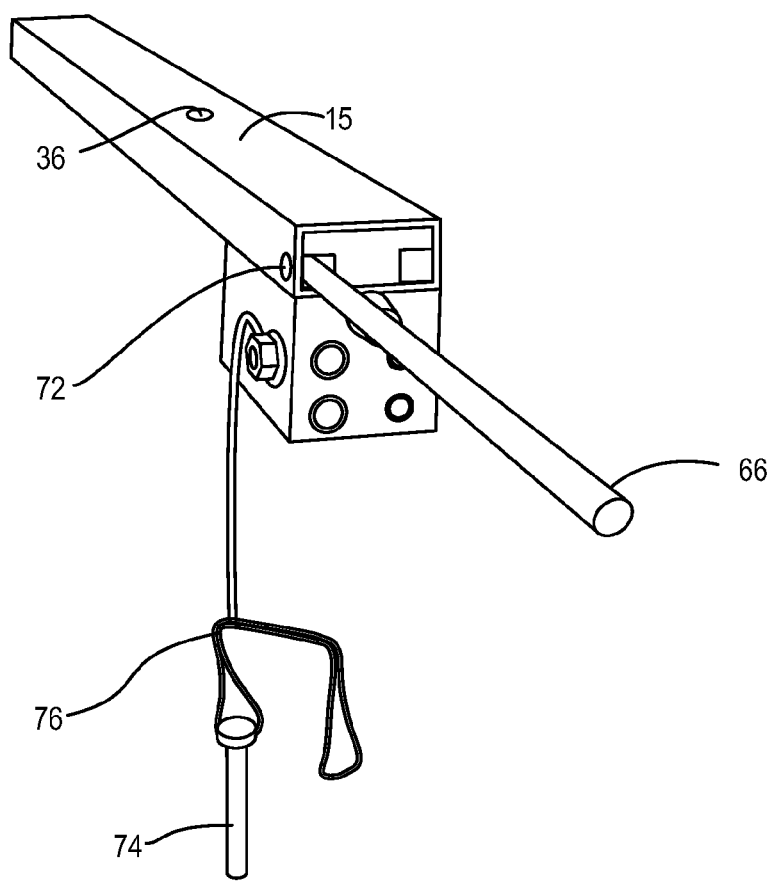
FIG. 7 is a perspective view of the first end of the jig with a bit partially removed, in accordance with the present invention.
Figure 8:
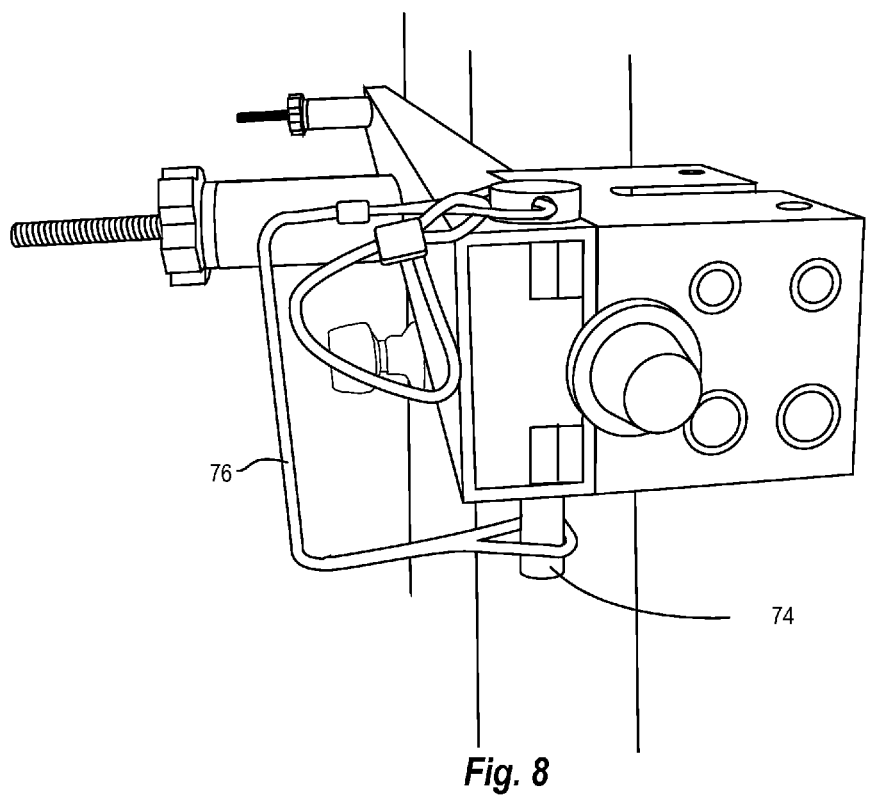
FIG. 8 is a perspective view of the first end of the jig with a locking pin in place, in accordance with the present invention.

FIG. 7 shows the bit 66 in a partially protracted state relative to the stowed condition when completely inside the elongate member 15. In order to maintain the bits 66 within the elongate member 15 during storage and/or transport, a pin 74 is positioned within the through hole 72. After positioning the pin 74 in the through hole 72, the pin 74 may be locked in place with locking mechanism 76 as shown in FIG. 8. It should be understood that the pin 74 and locking mechanism 76 are provided as examples, but any other effective configuration could be used to maintain the position of the bit 66 within the elongate member 15 during storage.

Figure 9:
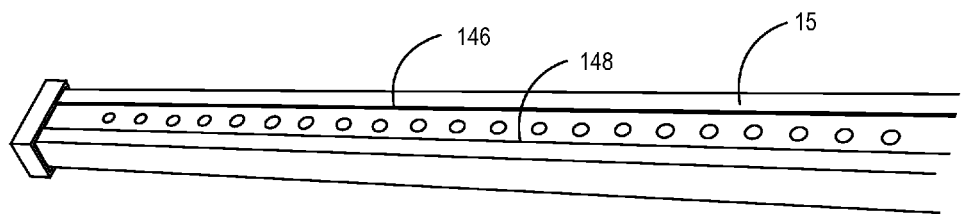
FIG. 9 is a perspective view of a back side of the second end of the jig, in accordance with the present invention.

As shown in FIG. 9, guide lines or scores 146 and 148 may be inscribed or scored onto the elongate member 15 on the end of the elongate member 15 that is distal from the bit guide 24. The guide lines are in alignment with respective through openings 27, 28, 29 and 30 in the bit guide 24. Similar lines or scores may be placed on an opposite lateral face of the elongate member 15 for sighting from that side by a user during positioning of the jig 12 on a door. However, since the elongate member 15 will generally extend beyond the widthwise edges of the door, the scores or lines shown in FIG. 9 may be sufficient.

Figure 10:
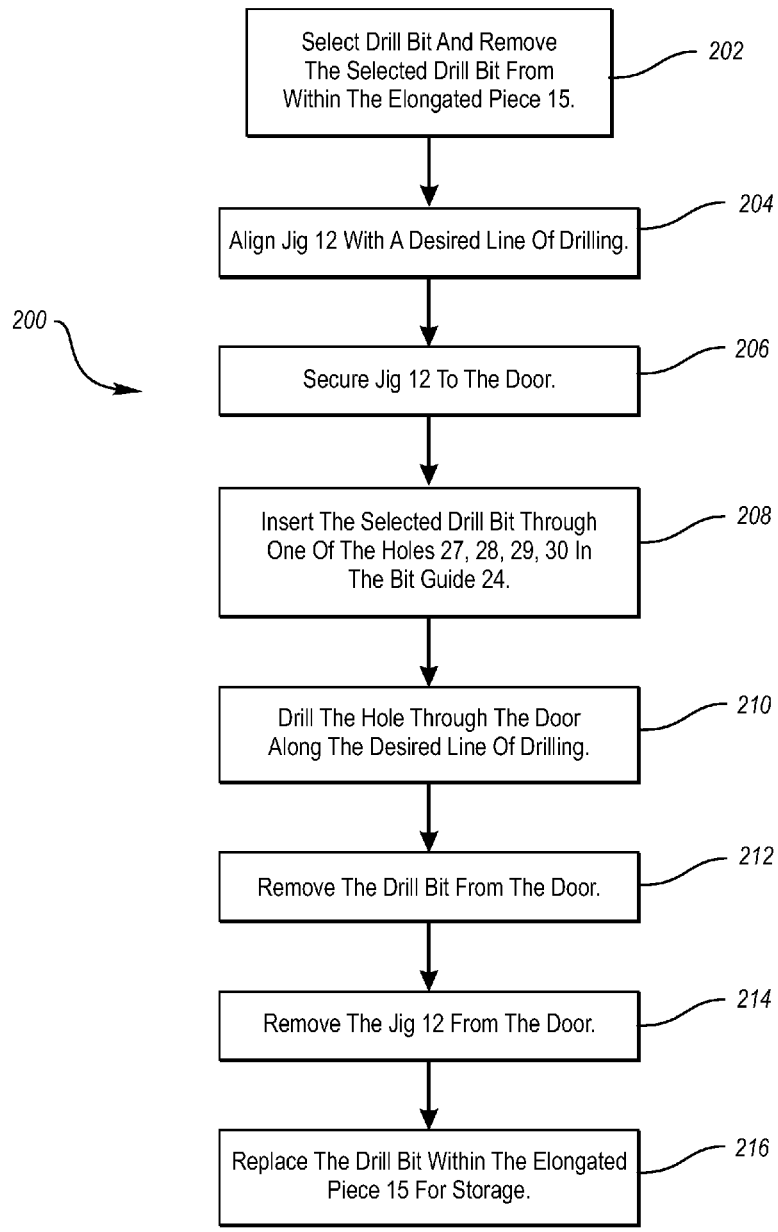
FIG. 10 is a flow chart illustrating a method of using the jig, in accordance with the present invention.

As shown in FIG. 10, a method 200 of using the jig 12 to drill a hole in a widthwise direction through a door includes step 202 of selecting a drill bit and removing the drill bit from within the elongate member 15 of the jig 12. Step 204 includes aligning the jig 12 with a desired line of drilling. Next, in step 206, the jig 12 is secured to the door. The step 206 of securing the jig 12 to the door includes inserting the jig securing elements 18 and 21 into through holes 35 and 36 in the elongate member 15 and turning a clamping knob 46 in a tightening direction so that the jig 12 is clampingly secured to the door. Then, the drill bit is inserted through one of the holes 27, 28, 29 and 30 in the bit guide 24 in step 208. In step 210, the hole is drilled through the door along the desired line of drilling. In step 212, the drill bit is removed from the door. In step 214, the jig 12 is removed from the door. The step 214 of removing the jig 12 from the door further includes turning the clamping knobs 46 of the jig securing elements 18 and 21 in a loosening direction and removing the jig securing elements 18 and 21 from the through holes 35 and 36 in the elongate member 15. Finally, in step 216, the drill bit is placed within the elongate member 15 of the jig 12 for storage.

The elongate member 15 is shown and described generally as being long in a direction corresponding to a width of a door. However, the elongate member 15 may be replaced by any member that may or may not be elongate. The member may be elongate in a direction other than the width of the door to which the jig is to be attached. The member need only have an aspect that may be aligned with a line to be drilled for perception by the user. For example, an inscribed line or score line on a member formed of sheet material could function in the same way and enable a user to align the through openings of the bit guide with the line.

Figure 11A:
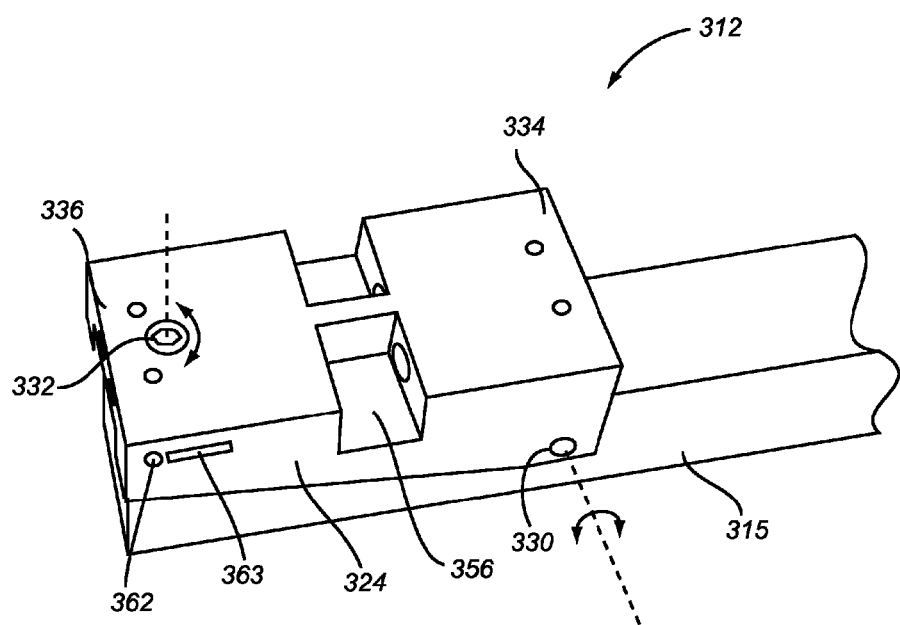
FIG. 11A is a perspective view of another embodiment of a drill bit jig in accordance with the present invention.
Figure 11B:
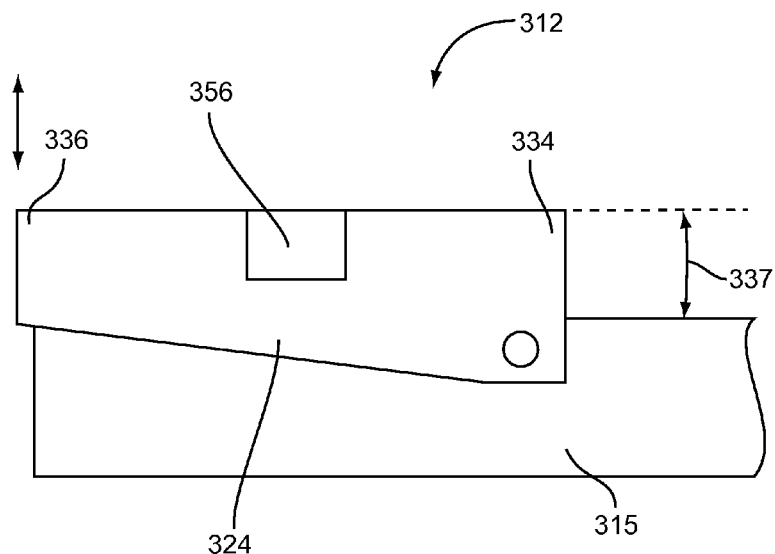
FIG. 11B is a side view of the jig of FIG. 11A.
Figure 11C:
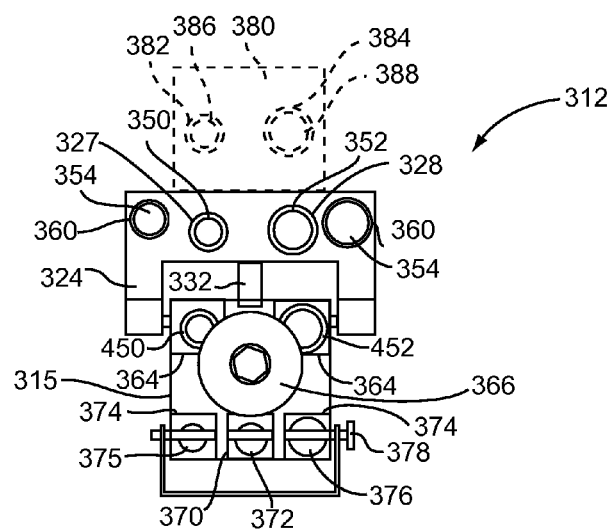
FIG. 11C is an end view of the jig of FIG. 11A.

Referring to the drawings again, FIGS. 11A-C depict a jig 312 in accordance with particular embodiments of the present invention. The jig 312 includes an elongate member 315, two jig securing elements (not shown but similar to securing elements 18 and 21 discussed above), and a rotatable bit guide 324. In practice, the knob and a hinge of a door would be removed and the elongate member 315 would be aligned with the opening in the door that receives the knob. Then a hole would be drilled in a generally widthwise direction from the knob area to the hinge mounting area. Then wiring for carrying security signals could be placed in the hole.

The embodiment of the present invention shown in FIGS. 11A-C are substantially similar to that of the previous embodiments discussed above with the exception of the rotatable drill bit guide 324. The rotatable bit guide 324 is shown extending transversely from the elongate member 315 and in operation is positioned in alignment with the thickness aspect of a door. The rotatable drill bit guide 324 comprises an axis of rotation 330 coupling a first end 334 of the drill bit guide to the elongate member 315. The rotatable drill bit guide 324 further comprises an adjustment mechanism 332 coupled between a second end 336 of the rotatable drill bit guide 324 and the elongate member 315, wherein the rotatable drill bit guide 324 rotates about the axis of rotation 330 in response to actuation of the adjustment mechanism 332. In particular embodiments, the adjustment mechanism 332 is a bolt, wherein the adjustment mechanism 332 is actuated in response to rotation of the bolt. The rotation of the adjustment mechanism 332 in each direction corresponds to a direction rotation of the rotatable drill bit guide 324. This occurs as the rotation of the adjustment mechanism moves the second end 336 toward and away from the elongate member 315. The rotatable drill bit guide 324 is rotated through a predetermined range of rotation depicted as angle 337, wherein the range of rotation is determined by the adjustment mechanism 332. The rotation of the drill bit guide 324 results in the change of angle 337 between the drill bit guide 324 and the elongate member 315. This allows the drill bit to enter the door at a user defined angle 337 in order to account for deflection of the drill bit as it travels through the door, thereby allowing the drill bit to exit the door dead center on the other side and to further prevent inadvertent damage to the faces of the door.

While shown that the first end 334 includes the axis of rotation 330 and the adjustment mechanism 332 is coupled to the second end 336, it will be understood that the positions of the axis of rotation 330 and the adjustment mechanism 332 may be flipped, wherein the axis of rotation is coupled to the second end 336 and the adjustment mechanism 332 is coupled to the first end 334. In this embodiment, the adjustments described above for the first end 334 and second end 336 would also be flipped during operation of the drill bit jig 312.

The rotatable drill bit guide 324 includes through openings 327 and 328 that form part of the bit guide 324 and have longitudinal axes that are aligned to a longitudinal axis of the elongate member 315. Thus, when a bit is guided through one of the openings 327 and 328 in the rotatable drill bit guide 324 and drilled through a door, the bit can remain aligned and avoid damage or ruin to the door by the bit coming out through the front or rear face of the door in a thickness direction. Depending on the core material of the door, such as a wood core, a mineral core, a steel core and the like, the drill bit may deflect a certain amount and result in a the drill existing off dead center, or further exiting the door through the front or rear face of the door. This deflection is often caused by the inability of the drill bit to transfer all of the shaving of the door material out of the hole being drilled. The rotatable drill bit guide 324, is rotatable to account for such deflection to ensure that the drill bit exits the door in a predictable manner and without unnecessary damage to the door.

The jig 312 may further include notches 356. One function of the notches 356 is to allow a user to clean out debris and other material resulting from the drilling process to reduce wear on drill bit guide 324.

Further, the jig 312 may further include bushings 350 and 352 that are inserted within the through openings 327 and 328 respectively. The bushings or liners 350 and 352 protect the through holes 327 and 328 against premature wear. Also, the bushings 350 and 352 may advantageously provide reduced friction between the bits and the jig 312 during drilling.

As the bushings 350 and 352 wear, they need to be replaced. In order to replace the bushings 350 and 352, a user uses a bushing driver 354 that may inserted within the through openings 327 and 328 by use of notches 356. A force by use of a driver may be applied to the bushing driver 354 in order to extract and push the bushings 350 and 352 out. During times of non-use, the bushing drivers 354 are stored within bushing driver retainers 360. The bushing driver retainers 360 may be coupled within the drill bit guide 324 proximate an end of the drill bit guide 324. The bushing driver retainers 360 receive the bushing drivers 354 and retain them within the bushing driver retainers 360 by use of set screws 362 that are moveable between an engaged and disengaged position, wherein the engaged position is one wherein the set screws 362 contact the bushing drivers 354 and the disengaged position is when the set screws 362 do not contact the bushing drivers 354. When the set screws 362 are moved from the engaged to the disengaged position, the bushing drivers 354 can be removed. According to particular embodiments, an allen wrench or other type of elongate tool is inserted within slots 363 and is slid along the slot by applied force from a user, wherein the allen wrench pushed the bushing drivers 354 out of the bushing driver retainers 360.

The jig 312 may further include bushing retainers 364 for receiving extra bushings 450 and 452. The bushing retainers 364 are coupled within the elongate member 315 proximate and end of the elongate member 315. The bushings are held within the bushing retainers 364 by use a retaining member 366. In particular embodiments, the retaining member 366 overlaps each of the bushing retainers 364 in order to prevent accidental sliding out of the bushings 450 and 452. The retaining member 366 is held in place by use of a bolt, wherein to engage and disengage the retaining member 366 from bushing retainers 364, the bolt may be inserted or removed respectively. Disengaging the retaining member 366, allows the user to remove the bushings 450 and 452.

Further, the drill bit jig may include drill bit retainers 374 coupled within the elongate members 315 proximate end and extending substantially the entire length of the elongate member 315 for receiving drill bits 375 and 376, wherein drill bit 375 is a different thickness or diameter than drill bit 376. Further, the drill bit jig 312 may further include a starter bit retainer 370 to releasably retain a starter bit 372 for starting the drilling process. A locking mechanism 378, such as, but not limited to, a snap pin may be used to retain the drill bits 375 and 376 and start bit 372 within their respective retainers.

Additionally, embodiments of the present invention may also include an attachment guide 380, wherein the attachment guide comprises through holes 382 and 384 having bushings 386 and 388. the attachment guide 380 is removably coupled to the rotatable drill bit guide 324 in order to allow a user to drill through the center of a door that is wide. The attachment guide 380 may be coupled by use of bolts to the drill bit guide 324.

Another embodiment of the present invention includes a method of using the jig 312 to drill a hole in a widthwise direction through a door. The method includes the steps of selecting a drill bit and removing the drill bit from within the elongate member 315 of the jig 312; aligning the jig 312 with a desired line of drilling; mounting the jig to the door; rotating the rotatable drill bit guide 324 to account for deflection of the drill bit through the work piece; drilling the hole along the desired line of drilling using the drill bit; and removing the jig from the work piece. The step of securing the jig 312 to the door includes inserting the jig securing elements into through holes in the elongate member 315 and turning a clamping knob in a tightening direction so that the jig 312 is clampingly secured to the door. Then, the drill bit is inserted through one of the holes 327 and 328 in the bit guide 324. The step of removing the jig 312 from the door further includes turning the clamping knobs of the jig securing elements in a loosening direction and removing the jig securing elements from the through holes in the elongate member 315. Finally, the drill bit is placed within the elongate member 315 of the jig 312 for storage.

It is to be understood that the bit sizes that may be used with the present invention are limitless. In a broad range the bit sizes may include sizes from one thirty-second of an inch to one and a half inches in diameter. In another range the bit sizes may range from one eighth to one inch in diameter. In still another range, the bit sizes may range from three sixteenths to three fourths of an inch in diameter. In still another range the bit sizes may range from one quarter inch to one half inch in diameter. Sizes of one quarter inch, five sixteenths inch, and three eighths inch are standard bit sizes that may be used in conjunction with the present invention. The through openings of the bit guide may be made to accommodate these sizes and any size within the ranges set forth above. The through opening diameters may be made to accommodate predetermined sizes within these ranges with or without liners or bushings.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A drill bit jig system comprising:
a hollow elongate member;
at least one drill bit that fits within the elongate member for storage;
two jig securing elements, coupled to the elongate member, wherein the two jig securing elements each comprise an L-shaped bolt wherein a straight portion of the L-shaped bolt is encased in a door protecting material; and
a rotatable drill bit guide coupled to the elongate member, the rotatable drill bit guide having a plurality of through holes for receiving the at least one drill bit.

2. The system of claim 1, wherein the rotatable drill bit guide comprises an axis of rotation of a first end.

3. The system of claim 2, wherein the rotatable drill bit guide further comprises an adjustment mechanism coupled to a second end of the drill bit guide, wherein the drill bit guide rotates about the axis of rotation in response to actuation of the adjustment mechanism.

4. The system of claim 3, wherein the adjustment mechanism is a bolt, wherein the adjustment member is actuated in response to rotation of the bolt.

5. The system of claim 4, wherein the rotation of the adjustment mechanism in each direction corresponds to rotation of the drill bit guide.

6. The system of claim 3, wherein drill bit guide is rotated through a predetermined range of rotation, wherein the range of rotation is determined by the adjustment mechanism.

7. The system of claim 3, further comprising a plurality of drill bits of different thicknesses and a plurality of through holes in the rotatable drill bit guide.

8. The system of claim 1, wherein the door protecting material is a generally rectangular piece configured to fit between a hinged edge of a mounted door and a door jamb.

9. The system of claim 1, further comprising a bushing removably coupled within each through hole.

10. The system of claim 9, further comprising a bushing driver retainer within the drill bit guide, wherein the bushing driver retainer releasably retains a bushing driver.

11. The system of claim 9, further comprising a bushing retainer coupled within the elongate member proximate end, wherein the bushing retainer releasably retains extra bushings.

12. The system of claim 1, further comprising a starter bit retainer coupled within the elongate member at a proximate end, wherein the starter bit retainer releasably retains a starter bit.

13. A drill bit jig system comprising:
a hollow elongate member;
at least one drill bit that fits within the elongate member for storage;
two jig securing elements coupled to the elongate member;
a rotatable drill bit guide coupled to the elongate member, the rotatable drill bit guide having a plurality of through holes for receiving the at least one drill bit;
a bushing removably coupled within each through hole; and
a bushing driver retainer within the drill bit guide, wherein the bushing driver retainer releasably retains a bushing driver.

\* \* \* \* \*